Feb. 18, 1964 R. I. EYLER 3,121,831
AUTOMATIC CONTROL SYSTEM FOR POSITIONING OBJECTS
Filed Sept. 8, 1961
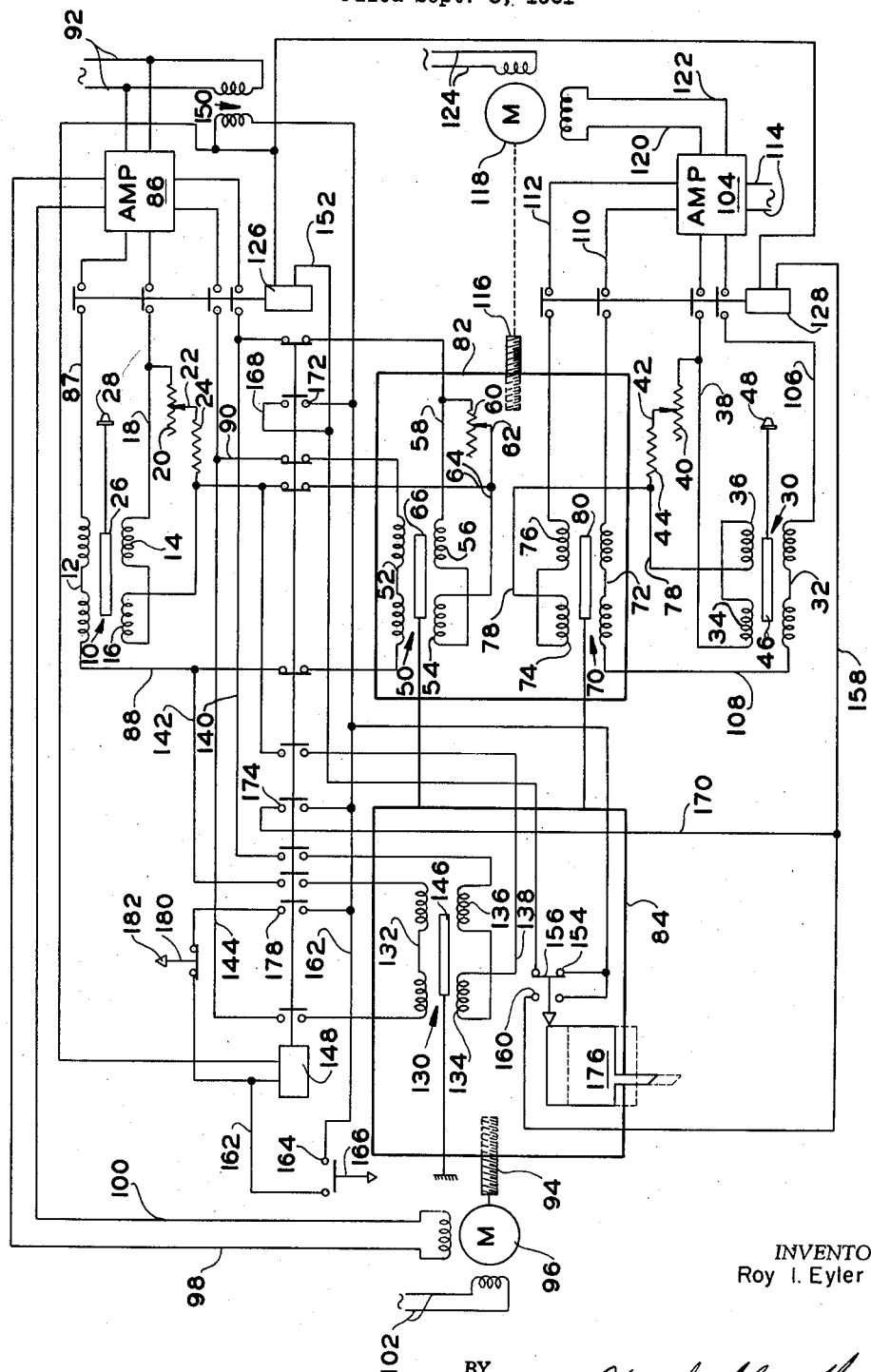
INVENTOR
Roy I. Eyler
BY *Strauch, Nolan & Neale*
ATTORNEYS United States Patent Office  3,121,831
Patented Feb. 18, 1964

3,121,831
AUTOMATIC CONTROL SYSTEM FOR POSITIONING OBJECTS
Roy I. Eyler, Waynesboro, Pa., assignor to Landis Machine Company, Waynesboro, Pa., a corporation of Pennsylvania
Filed Sept. 8, 1961, Ser. No. 136,922
8 Claims. (Cl. 318—19)

This invention relates to improvements in electrical systems for the control of mechanical movements and, more particularly, to such systems employing differential transformers as mechanical-electrical transducers.

Null-balance systems are known in which a signal transmitter utilizes a differential or like movable armature transformer, the armature of which is displaced from its null position in response to variations in a condition to generate signal output of given, or opposite phase and of amplitude proportional to the displacement of the armature from its null position. A receiver, is provided, including a similar differential transformer, the positioning of the relatively movable armature of which is a function of a servo-motor movement, which motor moves in the proper sense in response to unbalance between the transmitter and receiver signal and stops when balance in the transformer circuit is achieved. In other words the receiver or measuring network is maintained in, or returned to, balance by a reversible electric motor under the direction or control of a separate network sensitive to the unbalance of the measuring network.

In accordance with the present invention, a new form of null-balance system is provided which establishes an automatically repetitive linear mechanical movement. Stated another way, the control system of the present invention effectively divides the total rectilinear movement of a body into any desired number of increments, the moved body being retained in a fixed position after each increment of movement for an appreciable time. As a specific example of the uses of which this invention may be put, the tool slide of a machine tool can be moved along the axis of a workpiece, indexing intermittently to a succession of work stations at each of which a machining operation is performed on the workpiece. Upon completion of such a series of movements, the tool slide can be returned to its starting position. Although other means have been employed for similar purposes, none have the extreme accuracy obtainable with the system of this invention.

A pair of null-balance systems, each having a pair of differential transformers, are interconnected electrically and mechanically, to balance and unbalance each other alternately. Each system serves in turn as a device to cause movement of the other and as a device to measure the extent of such movement. A fifth differential transformer restores the circuit automatically to the initial position and condition at the end of each complete cycle.

It is an object of the invention to provide a system of differential transformers for automatically producing a desired number of incremental mechanical movements in a single direction, said movements being precisely measurable.

Another object is to provide a system of the above description incorporating two null-balance systems, an operating member and a pilot member, one differential transformer of each null-balance system being mounted on the pilot member and having an armature connected to the operating member.

A still further object of the invention is to provide, in a control system having a number of differential transformers, an additional differential transformer which can be installed in the circuit temporarily in the place of one of the other differential transformers to restore the system to its initial condition after a series of incremental movements.

Further objects and advantages of the invention will be apparent from the following description and the accompanying schematic drawing of one embodiment of the invention.

The circuit illustrated in the drawing comprises a differential transformer 10 having a primary 12 and two secondaries 14 and 16 in bucking relation. One end of secondary 14 has a connector 18 leading to one end of a potentiometer 20, functioning as a variable resistance, and the slider 22 leads to one side of the resistance 24. The differential transformer 10 has an armature or core 26, the position of which relative to the complemental stator portions of differential transformer 10 may be set manually by rotating the adjusting knob 28. Thus, the differential transformer 10 with its setting means constitutes a set-point transmitter, which may be mounted on any convenient stationary portion of the machine to which the invention is applied.

A second and similar set-point transmitter is provided, comprising the differential transformer 30 with a primary 32 and two secondaries 34 and 36 in bucking relation. One end of secondary 34 has a connector 38 leading to one end of a potentiometer 40, functioning as a variable resistance, and the slider 42 leads to one side of a resistance 44. The differential transformer 30 has an armature 46, the position of which relative to the complemental stator portions of differential transformer 30 may be set manually by rotating the adjusting knob 48. This set-point transmitter also may be mounted on any convenient stationary portion of the machine.

A third differential transformer 50 is provided, having a primary 52 and two secondaries 54 and 56 in bucking relation. One end of secondary 56 has a connector 58 leading to one end of a potentiometer 60, functioning as a variable resistance, and the slider 62 has a connector 64 leading to the resistance 24 and to one side of each of the secondaries 16 and 54 of the differential transformers 10 and 50 respectively. The differential transformer 50 has an armature 66 which is positioned by means described below.

A fourth differential transformer 70 is provided having a primary 72 and two secondaries 74 and 76 in bucking relation. One end of secondary 74 has a connector 78 leading to the resistance 44 and to one end of the secondary 36 of the differential transformer 30. Differential transformer 70 has an armature 80 which is positioned by the same means as armature 66.

The differential transformers 50 and 70 may be mounted on a movable body or slide 82 and arranged so that the axes of their armatures 66 and 80 are mutually parallel and parallel to the path of movement of the slide 82, which, for present purposes, is termed the pilot slide. The armatures 66 and 80 are mechanically connected to a second slide 84, termed the power slide and are capable of rectilinear movement parallel to that of the pilot slide 82. It will be observed, therefore, that any relative movement between pilot slide 82 and power slide 84 displaces the armatures 66 and 80 relative to their associated windings.

The differential transformers 10 and 50 are energized by the reduced voltage output of the power supply transformer of an amplifier 86 by connecting the primaries 12 and 52 in series to the amplifier 86 through lines 87, 88 and 90. The connectors 18 and 58 from the secondaries 14 and 56 respectively, are connected to the primary winding of an input transformer of an amplifier 86, which, in turn, is energized by a power source 92.

The power slide 84 is provided, illustratively, with a screw 94 for effecting the rectilinear movement of the slide 84 upon rotation of the screw. The screw 94 is connected in a conventional manner to a power motor 96. The motor 96 is a two-phase, reversible motor with one phase, 98 and 100, running as a function of the output of the amplifier 86. Power is fed to the other motor winding through supply lines 102.

The differential transformers 30 and 70 are energized by the reduced voltage output of the power supply transformer of an amplifier 104 by connecting the primaries 32 and 72 in series to the amplifier 104 through lines 106, 108 and 110. The connectors 38 and 112 from the secondaries 34 and 76 respectively, also lead to the primary of an input transformer of an amplifier 104 which is energized by supply lines 114.

The pilot slide 82 is provided, illustratively, with a screw 116 for causing movement of the pilot slide 82 in a path parallel to the movement of the power slide 84. The screw 116 is connected in a conventional manner to a pilot motor 118. The motor 118 is also a two-phase, reversible motor with one phase, 120 and 122 running as a function of the output of the amplifier 104. Power is fed to the other motor winding through supply lines 124.

The lines 18, 58, 87 and 90, leading from the differential transformers 10 and 50 to the amplifier 86 are interrupted by the normally open contacts of a relay 126 for a purpose to be explained below. Similarly the lines 38, 106, 110 and 112, leading from the differential transformers 30 and 70 to the amplifier 104 are interrupted by the normally open contacts of a relay 128.

A fifth differential transformer 130 is mounted on the power slide 84 and has a primary 132 and two secondaries 134 and 136 in bucking relation. One end of secondary 134 is connected by a lead 138 to the line 64 and one end of secondary 136 is connected by a lead 140 to the line 58. That is to say the secondaries of the differential transformer 130 are connected to the amplifier 86 in parallel with the secondaries of the differential transformer 50. The opposite ends of the primary 132 are joined to the connectors 88 and 90 by leads 142 and 144, that is the primary 132 of the differential transformer 130 is connected to the amplifier 86 in parallel with the primary 52 of the differential transformer 50. The differential transformer 130 has an armature 146, mechanically connected as indicated in the drawing to some stationary part of the machine.

The lines 58, 64, 88 and 90 are interrupted by the normally closed contacts of a relay 148. The lines 138, 140, 142 and 144 are interrupted by normally open contacts of the same relay 148. Thus, when the relay 148 is not energized, the differential transformer 50 is connected in the circuit with differential transformer 10 and the amplifier 86 while, when the relay 148 is energized, the differential transformer 130 is substituted for the differential transformer 50 in that circuit.

A transformer 150 has its primary connected to the power supply line 92. One end of the secondary of transformer 150 is connected to each of the relays 126, 128 and 148, in parallel. The relay 126 is also connected by a line 152 through the contacts 154 of a limit switch 156 to the second end of the secondary of transformer 150. The relay 128 is connected by a line 158 through a second set of contacts 160 of the limit switch 156 to the second end of the secondary of transformer 150. The relay 148 is similarly connected by a line 162 to the secondary of transformer 150 through the contacts 164 of a normally open limit switch 166. Lines 168 and 170 are provided to connect lines 152, 158 and 162 to the secondary of transformer 150 through normally open contacts 172 and 174 of the relay 148.

As an illustration of the use to which the power slide 84 may be put, a tool-carrying slide 176 is shown mounted thereon for movement by any suitable means not shown in a path perpendicular to the path of movement of the power slide 84. The tool-carrying slide 176 is shown in its inoperative or retracted position, actuating the limit switch 156 to close contacts 154 and open contacts 160. When the tool-carrying slide 176 moves into operative position, (shown in dotted lines) the limit switch 156 is released, opening contacts 154 and closing contacts 160.

Prior to the operation of the device, the potentiometers 20, 40 and 60 can be adjusted by manually setting the sliders 22, 42 and 62 so that a null balance exists between the differential transformers 10 and 50 and between the differential transformers 30 and 70. From this zero position the knob 28 may be rotated manually to displace the armature 26 relative to the coils of differential transformer 10 by an amount equal to the desired increment of movement of the power slide 84. This displacement of the armature 26 produces a condition of unbalance between the set-point transmitter 10 and the differential transformer 50, which is temporarily serving as the receiver of this null-balance system.

This unbalance of the secondaries circuit, through the amplifier 86, places a motor-running voltage on the power motor 96 which thereupon rotates in the proper sense to draw the power slide 84 toward the left, illustratively, by means of the screw 94. The tool slide 176, being retracted at this time, holds the limit switch 156 in the position shown, closing contacts 154. Closing of contacts 154 closes a circuit through line 152 and the secondary coil of transformer 150 to energize the relay 126. Energization of the relay 126 closes all of its contacts in the lines 18, 58, 87 and 90. As the power slide 84 moves leftward, the armature 66 of the receiver 50 moves with the slide until the output of the receiver is again balanced with that of the transmitter 10, whereupon the motor stops, having moved the power slide 84 a distance precisely equal to the displaceemnt of the armature 26 produced by the knob 28.

The tool slide 176 may now be advanced and, as it does so, the limit switch 156 will be released, opening contacts 154 and closing contacts 160. A circuit is thus closed through line 158 and the secondary coil of transformer 150 to energize the relay 128. This energization of relay 128 closes the circuit between the differential transformers 30 and 70 and the amplifier 104. The relay 126 is de-energized.

The above-described leftward movement of the power slide 84, in addition to moving the armature 66 into balance position, displaces the armature 80 of the differential transformer 70 by the same amount. This displacement unbalances the circuit between the differential transformers 30 and 70 and, with the latter acting as the transmitter, places a motor-running voltage upon the pilot motor 118, through the amplifier 104. The motor 118 thereupon rotates in the proper sense to push the pilot slide 82 toward the left by means of the screw 116. With the power slide temporarily stationary, this leftward movement of the pilot slide 82 moves the coils of the differential transformer 70 relatively to the stationary armature 80 until the output of the receiver differential transformer 30 is again balanced with that of the transmitter 70, whereupon the motor 118 stops, having moved the pilot slide 82 a distance equal to the previous movement of the power slide 84 and in the same direction.

A tool mounted on the power slide 84 will perform its function during the leftward movement of the pilot slide 82, thus minimizing idle time. It will be seen that the same movement of the pilot slide 82 which moves the coils of the differential transformer 70 to restore the null balance between differential transformers 30 and 70, also moves the coils of differential transformer 50 relative to the armature 66. Since, prior to this movement of the pilot slide 82, the differential transformers 10 and 50 were in balance, such movement now reinstates a condition of unbalance exactly equal in degree and direction to that which existed just after the knob 28 was employed to set the initial unbalance between differential transformers 10 and 50. However, at this point both slides are just one incremental step leftward of their original positions.

When the tool slide 176 is withdrawn into inoperative position, it re-engages the limit switch 156, opening contacts 160 and closing contacts 154, thus energizing relay 126 and de-energizing relay 128. The system is then in position to repeat the operation described above with the insignificant difference that this time the differential transformer 50 is the "transmitter" and differential transformer 10 is the "receiver." By thus alternately unbalancing the differential transformer pairs 10, 50, 30, and 70, the power slide 84 can be caused to move to the left by precisely measured increments and to halt after each step for the tool it carries to operate and for the pilot slide to overtake it.

The length of total movement possible is a function of the length of the differential transformer 130. It will be noted that the differential transformer 130 is additively unbalanced by each incremental movement of the power slide 84, since each movement of the power slide displaces the coils of the differential transformer 130 to the left relative to the stationary armature 146. Therefore at the end of the series of movements of the power slide 84, the differential transformer 130 will be unbalanced relative to the associated differential transformer 10 by an amount equal to the total movement of the power slide 84. In other words, the displacement of the coils of this transformer, relative to the stationary armature 146, measures the distance necessary for the slides to move to the right to restore them to starting position.

At the end of the series of leftward movements, then, the power slide 84 operates the limit switch 166 to close the contacts 164. This closes a circuit through the line 162 and the secondary coil of transformer 150 to energize the relay 148. Energization of relay 148 closes the contacts 172 and 174 to energize relays 126 and 128 independent of the condition of the limit switch 156. A holding circuit is provided for relay 148 through contacts 178 and includes the contacts 180 of a normally closed switch 182. Energization of relays 126 and 128 will close all circuits leading to the amplifiers 86 and 104 respectively while energization of relay 148 will open lines 58, 64, 88 and 90, disconnecting the differential transformer 50 and will close lines 138, 140, 142 and 144 to associate the differential transformer 130 in the circuit with the set-point transformer 10. The latter is still biased for leftward movement of one increment while the differential transformer 130 is biased for rightward movement equal to the total of all increments. In response to this unbalance between the differential transformers 10 and 130, therefore, the servomotor 96 will operate in reverse direction to move the power slide 84 to the right until its original position is restored.

During this movement the armature 80 of the differential transformer 70 also moves to the right, creating a condition of unbalance between the differential transformers 30 and 70 in response to which the pilot motor 118 withdraws the pilot slide 116 to the right simultaneously with the movement of the power slide 84. At the end of this restoring movement of both slides the switch 182 is operated to open the holding circuit for relay 148, thus restoring the original electrical condition of the system. Switch 182 may be a limit switch, operable by the slide 84 as it returns to its original position, in which case the entire cycle will repeat automatically. Or the switch 182 may be manually operable, in which case the first cycle will end and a second one will not begin until the switch 182 is operated.

It will be noted that the length of each increment is not limited by the displacement of the armature 26 that can be effected in the set-point transmitter 10. If a longer increment is desired, the additional length may be set at the set-point transmitter 30, but in a direction opposite that set at transmitter 10. Thus each increment will be of a length equal to the sum of the initial unbalances set by the manual adjustment of the knobs 28 and 48.

This invention may be embodied in other specific forms without departing from the spirit or essential characteristics thereof. The present embodiment is therefore to be considered in all respects as illustrative and not restrictive, the scope of the invention being indicated by the apppended claims rather than by the foregoing description, and all changes which come within the meaning and range of equivalency of the claims are therefore intended to be embraced therein.

What is claimed and desired to be secured by United States Letters Patent is:

1. Apparatus for producing incremental repetitive movements of a body comprising a drive motor operatively connected to move said body, first and second elements displaceable away from a null position, said second element being movable with said body, means for generating a motor operating signal when said first and second elements are displaced from said null position to move said body and to restore said elements to said null position, third and fourth elements displaceable away from a null position, said third element being movable with said body, a pilot motor connected to move said first and fourth elements, means for generating a signal for operating said pilot motor when said third and fourth elements are displaced from said null position to restore said third and fourth elements to said null position and move first and second elements away from said null position to again operate said drive motor.

2. Apparatus for producing incremental repetitive movements of a body comprising a drive motor operatively connected to move said body, first and second connected differential transformers having a common output circuit and each having a displaceable armature, the armature of said second transformer being movable with said body, means for generating a signal for operating said drive motor when said output circuit of said first and second transformers is unbalanced to move said body and move the armature of said second transformer to balance said output circuit, third and fourth connected differential transformers having a common output circuit and each having a displaceable armature, the armature of said third transformer being movable with said body, a pilot motor connected to move the windings of said second and third transformers independently of the associated armatures, means for generating a signal for operating said pilot motor when said output circuit of said third and fourth transformers is unbalanced to move the windings of said second and third transformers to restore the balance of said output circuit of said third and fourth transformers and to establish an unbalance in said output circuit of said first and second transformers to again operate said drive motor.

3. Apparatus for producing incremental repetitive movements of a body comprising a drive motor operatively connected to move said body, first and second connected differential transformers having a common output circuit, said second transformer having an armature movable with said body, means for generating a signal for operating said drive motor when said output circuit is unbalanced to move said body and thereby move the armature of said second transformer to balance said output circuit, third and fourth connected differential transformers having a common output circuit, said third transformer having an armature movable with said body, a pilot motor connected to move the windings of said second and third transformers independently of their armatures, means for generating a signal for operating said pilot motor when said output circuit of said third and fourth transformers is unbalanced to move the winding of said third transformer to restore the balance in the output circuit of said third and fourth transformers and to establish an unbalance in said output circuit of said first and second transformers to again operate said drive motor.

4. Apparatus for producing incremental repetitive movements of a body comprising a drive motor operatively connected to move said body, first and second connected differential transformers having a common output circuit and each having an armature element and a winding element, said elements being relatively displaceable and one of said elements of said second transformer being movable with said body, means for generating a signal for operating said drive motor when the output circuit of said first and second transformers is unbalanced to move said body and move said one element of said second transformer to balance said output circuit, third and fourth connected differential transformers having a common output circuit and each having an armature element and a winding element, said elements of said third and fourth transformers being relatively displaceable and one of said elements of said third transformer being movable with said body, a pilot motor connected to move the others of said elements of said second and third transformers relative to said ones of said elements thereof, means for generating a signal for operating said pilot motor when said output circuit of said third and fourth transformers is unbalanced to move said others of said elements of said second and third transformers to restore the balance in said output circuit of said third and fourth transformers and to establish an unbalance in said output circuit of said first and second transformers to again operate said drive motor.

5. Apparatus according to claim 2 together with a fifth differential transformer having a stationary armature and having windings movable with said body, switch means operative to replace said second transformer electrically with said fifth transformer after a series of said incremental movements of said body, whereby said means for generating a signal for operating said drive motor moves said windings of said fifth transformer to balance the output circuit of said fifth and first transformers.

6. Apparatus according to claim 5 wherein said switch means is operated automatically upon completion of a predetermined number of said incremental movements of said body.

7. Apparatus according to claim 4 plus a fifth differential transformer having an armature element and a winding element, one of said elements being stationary and the other of said elements being movable with said body, switch means operative to replace said second transformer electrically with said fifth transformer after a series of said incremental movements, whereby said means for generating a signal for operating said drive motor moves said other of said elements of said fifth transformer to balance the output circuit of said fifth and first transformers.

8. Apparatus according to claim 7 plus additional switch means for replacing said fifth transformer electrically with said second transformer.

References Cited in the file of this patent

UNITED STATES PATENTS

| | | |
|---|---|---|
| 2,440,600 | Crosby | Apr. 27, 1948 |
| 2,774,021 | Ehret | Dec. 11, 1956 |